(12) United States Patent
Stucki et al.

(10) Patent No.: US 10,343,777 B2
(45) Date of Patent: Jul. 9, 2019

(54) HELICOPTER LOAD HOOK

(71) Applicant: KOPTER GROUP AG, Mollis (CH)

(72) Inventors: Martin Stucki, Pfäffikon (CH); Cosimo Donno, Pfungen (CH)

(73) Assignee: KOPTER GROUP AG, Mollis (CH)

( * ) Notice: Subject to any disclaimer, the term of this patent is extended or adjusted under 35 U.S.C. 154(b) by 243 days.

(21) Appl. No.: 15/364,793

(22) Filed: Nov. 30, 2016

(65) Prior Publication Data

US 2017/0152042 A1 Jun. 1, 2017

(30) Foreign Application Priority Data

Dec. 1, 2015 (CH) ........................................ 1755/15

(51) Int. Cl.
*B64D 9/00* (2006.01)
*B64D 1/22* (2006.01)
*B66C 1/36* (2006.01)
*B64C 27/04* (2006.01)

(52) U.S. Cl.
CPC ................. *B64D 9/00* (2013.01); *B64D 1/22* (2013.01); *B66C 1/36* (2013.01); *B64C 27/04* (2013.01)

(58) Field of Classification Search
CPC ... B64D 9/00; B64D 1/22; B64D 1/00; B64D 1/12; B64C 27/04; B66C 1/36; B66C 1/34
See application file for complete search history.

(56) References Cited

U.S. PATENT DOCUMENTS 3,575,459 A * 4/1971 Coblenz ................... B64D 1/22
294/82.32
5,735,025 A * 4/1998 Bailey .................... F16B 45/02
24/600.1
8,746,766 B2 * 6/2014 Lewkoski ................. B66C 1/36
294/33
2005/0127695 A1 * 6/2005 Cranston ................... B66C 1/34
294/82.3
2006/0175851 A1 * 8/2006 Snyder ...................... B66C 1/34
294/82.33

(Continued)

FOREIGN PATENT DOCUMENTS

GB 839629 A 6/1960

OTHER PUBLICATIONS

International Search Report dated Feb. 18, 2016 for Swiss Application No. CH17552015, 2 pages.

*Primary Examiner* — Assres H Woldemaryam
(74) *Attorney, Agent, or Firm* — Paul D. Bianco; Gary S. Winer; Fleit Gibbons Gutman Bongini & Bianco PL

(57) ABSTRACT

A helicopter load hook has a release mechanism that can be mounted in a fixed position in a housing for controllable identification and release of a swivel movement of a hook. The release mechanism includes a magnetic switch and a drum that can rotate. The release mechanism also includes at least one latching piece, which can be swivelled about a latching piece axis of rotation and at least one force receiver, which can be swivelled about a swivel axis, together with a pin. The pin can be connected with a locking lug on the drum together with a hook follower on the hook, such that an indirect connection between the hook and the drum, or more particularly, the magnetic switch, can be achieved, and any direct contact between the hook and the magnetic switch is eliminated. In the closed position of the hook the pin makes any swivelling movement of the hook impossible.

12 Claims, 4 Drawing Sheets

(56) References Cited

U.S. PATENT DOCUMENTS

| | | | |
|---|---|---|---|
| 2009/0072562 A1* | 3/2009 | Brunner | B66C 1/34 294/82.2 |
| 2011/0042984 A1* | 2/2011 | Rocourt | A62B 35/0081 294/82.33 |
| 2014/0252170 A1* | 9/2014 | Prud'Homme-Lacroix | B64C 7/00 244/121 |

* cited by examiner

FIG. 1a
FIG. 1b
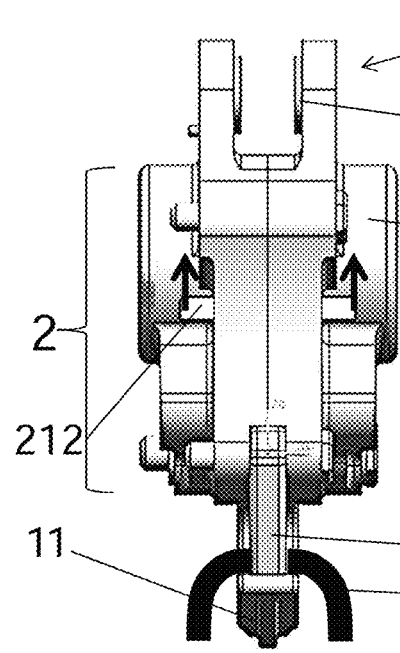
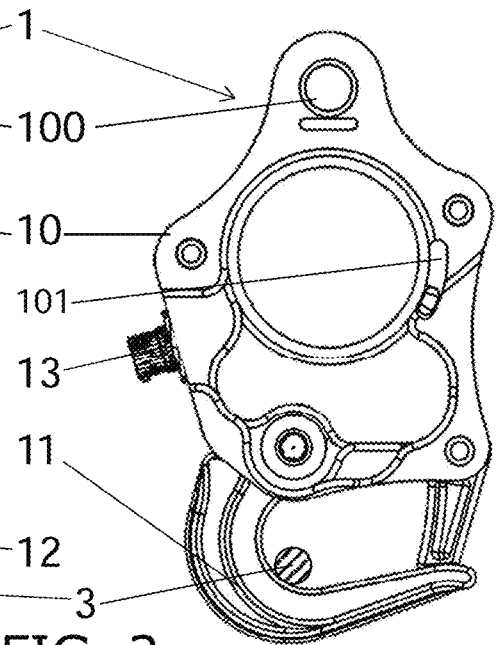
FIG. 2
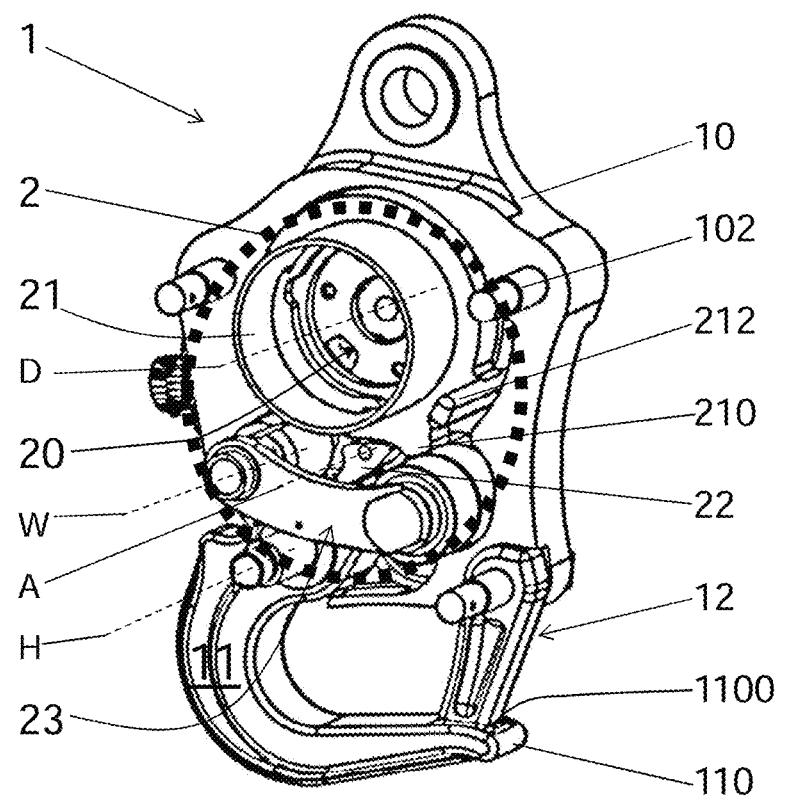

FIG. 5
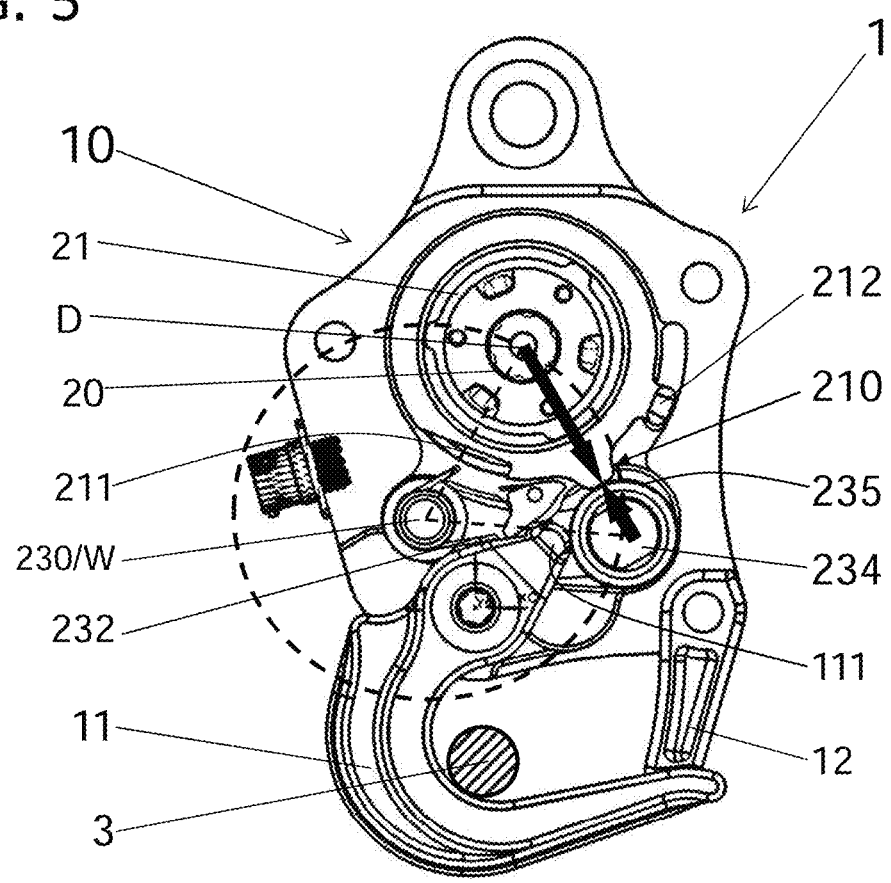
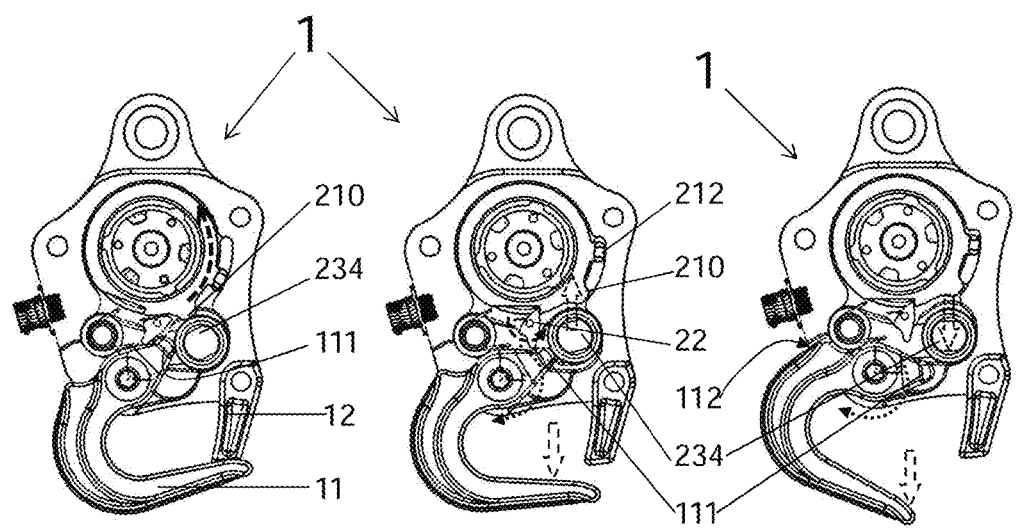
FIG. 6a   FIG. 6b   FIG. 6c

HELICOPTER LOAD HOOK

TECHNICAL FIELD

The present invention describes a helicopter load hook, comprising a release mechanism that can be mounted in a fixed position in a housing for purposes of a controllable identification and release of a swivel movement of a hook about a hook axis of rotation, wherein the release mechanism comprises a magnetic switch and a drum that can rotate.

PRIOR ART

In order that helicopters can also be employed for load-carrying flights, there are helicopter load books of known art that can be attached onto the underside of a cabin structure of the helicopter. As a general rule such helicopter load hooks can be obtained equipped with various drives that can be controlled remotely.

In U.S. Pat. No. 3,575,459 a helicopter load hook with a housing is described, which allows a swivellable movement and an automatic release of the helicopter load hook by means of an actuation mechanism, so that no personnel are required for purposes of opening the helicopter load hook. A swivellable hook is arranged in the housing of the helicopter load hook, which hook interacts with an eccentrically arranged release mechanism.

In order that the hook can remain in the closed position a spring or counterweights are provided, which force the hook into the closed position. The tip of the hook, which projects from the housing, interacts with a swivellable security latch. The security latch is also pressed against the hook with the aid of a spring in order that the hook does not release a load unintentionally.

A plurality of detent arms, held in a clamped manner by means of springs, are used, wherein the detent arms interact with detent plates, so that an opening of the hook can be achieved. A multipart trigger mechanism is necessary, which can be swivelled about a further axis of rotation. The trigger mechanism comprises a magnetic switch, also called a solenoid, by means of which the trigger mechanism can be triggered electromagnetically, and with it the release mechanism, by the actuation of a drive lever and a trigger arm. The trigger mechanism has means that can interact with corresponding means of the detent plate.

In overall terms the helicopter load hook and in particular the release mechanism are equipped with a multiplicity of components, wherein by virtue of the utilisation of many springs and delicately configured levers and arms, the result is a complicated and not very robust release mechanism. The release mechanism can be actuated electrically, but by virtue of its design operates in an unstable manner. In U.S. Pat. No. 3,575,459, in a further form of embodiment, two of the helicopter load hooks as described are in fact each combined with a release mechanism. However, this configuration also appears to be not very robust mechanically by virtue of the components used, and accordingly requires more complex maintenance and control, and as a result of the number of components an intricate production. Moreover, no means are provided to allow the pilot to detect from the cockpit the momentary position of the helicopter load hook.

A further helicopter load hook is described in US 2006175851. A hook is mounted in a housing such that it can rotate, and by means of a release mechanism the hook can be brought out of a closed position into an open position. Here a magnetic switch in the form of a solenoid operates directly on two arms of the release mechanism. The forces from the hook acting directly on the magnetic switch are disadvantageous, and lead to severe wear. Accordingly, extensive periodic maintenance of the helicopter load hook, together with the release mechanism, is necessary. The helicopter load hook of US 2006175851 does in fact have sensors, which control LEDs via electronics, so that the ground personnel with the aid of the LEDs can establish whether the hook is located in its correct closed position. However, the pilot has no possibility of seeing the state of closure of the helicopter load hook from the helicopter cockpit.

SUMMARY OF THE INVENTION

The present invention has set itself the task of designing a helicopter load hook with a release mechanism, wherein the helicopter load hook and the release mechanism each has a compact build with a reduced number of components and an increased mechanical stability, wherein forces and torques acting on the magnetic switch are reduced. By virtue of minimised wear the maintenance intervals that are necessary can thereby be increased.

The said task is solved with the release mechanism of a helicopter load hook as disclosed herein.

In addition, a pilot is awarded the opportunity of easily detecting the closed position and open position of the hook of the helicopter load hook from the helicopter cockpit.

BRIEF DESCRIPTION OF THE FIGURES

A preferred example of embodiment of the subject of the invention is described in what follows, in conjunction with the accompanying figures.

FIG. 1a shows a side view of a helicopter load hook, while

FIG. 1b shows a plan view onto the helicopter load hook with the hook in the closed position.

FIG. 2 shows a perspective view of the helicopter load hook with a partially open housing.

FIG. 3 shows a perspective view of a force receiver, while

FIG. 5 shows a view onto a helicopter load hook with a partially removed housing, wherein the forces acting in the closed position are represented.

FIGS. 6a-6c show views of the hook in various states from the closed position to the open position, while

DESCRIPTION

Figure 3:
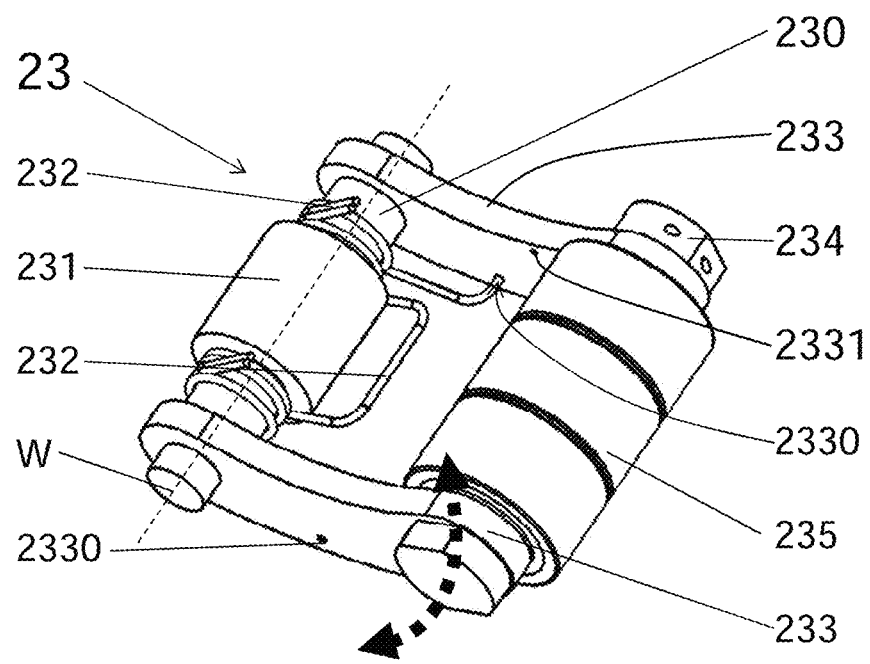

A helicopter load hook 1 comprises a housing 10, which here is embodied in two parts and, equipped with at least one housing eye 100, can be attached directly or indirectly onto a cabin structure of a helicopter. At the end of the housing 10 distant from the housing eye 100 is located a hook 11 that can be swivelled, which in a closed position is held, operatively connected, with a fixed security latch 12. A load can be attached to the hook 11 by means of a suspended load cable 3. Here the cabin structure and the load are not represented.

In the centre of the helicopter load hook 1 a release mechanism 2 is located within the housing 10; this determines the position of the hook 11, that is to say, it fixes the hook 11 in a closed position, and can release it in a controlled manner. By means of at least one indicator flag 212, which can be moved by the release mechanism 2, the current position of the hook 11 of the helicopter load hook 1 is displayed, so that the said current position can be detected by a helicopter pilot from the cockpit. In the housing 10, or more particularly, in a part of the housing, an indicator opening 101 is cut out, through which the indicator flag 212 can be moved, and through which it protrudes from the housing 10.

Here the helicopter load hook 1, that is to say, the release mechanism 2, can be actuated by means of control electronics, not shown. The control electronics are connected via at least one electrical terminal 13 with the release mechanism 2. However, other means of actuation of the release mechanism 2 are optionally possible, for example, it can be mechanically or hydraulically released, wherein combinations of these can also be embodied. In what follows, however, a purely electrical means of actuation is described.

Here the hook 11 has a hook tip 110 with a recess 1100. In the closed position of the hook 11, part of the security latch 12 is accommodated in the recess 1100, as a result of which any inadvertent opening of the hook 11 is additionally prevented.

FIG. 2 shows a housing 10, wherein one half of the housing has been removed. The halves of the housing accommodate the components described in what follows, and can be connected by means of attachment 102 to form a closed housing 10. Since the housing 10 must be opened for maintenance purposes, a screwed connection, and thereby a detachable connection, of the halves of the housing presents itself as an option.

The release mechanism 2 is arranged centrally in the housing 10 between the at least one housing eye 100 and the moveable hook 11, as highlighted by the dashed circle. The release mechanism 2 comprises at least one magnetic switch 20, a drum 21, a latching piece 22, and a force receiver 23.

The magnetic switch is designed in the form of a solenoid, in which a magnetic field can be generated, controlled by means of control electronics. The magnetic switch 20 is thereby capable of rotating the drum 21 by means of an electromagnetic drive about an axis of rotation D of the magnetic switch. A locking lug 210 and the indicator flag 212 are arranged, or formed, on the drum 21; during actuation these can rotate with the drum 21.

The force receiver 23 can rotate about a swivel axis W, the latching piece 22 can rotate about a latching piece axis of rotation A, and the hook 11 can rotate about a hook axis of rotation H, wherein all the axes W, A, H are aligned in parallel with one another, approximately at right angles to the plane in which the hook 11 can move.

The force receiver 23 is represented in detail in FIG. 3. A shaft 230 with the swivel axis W, and a pin 234, are held together by two connecting plates 233. At least one buffer stop 231, and at least one spring 232, are arranged on the shaft 230. Spring retainers 2330 are formed in the connecting plates 233, in which the spring 232 can be attached in a preloaded manner in the force receiver 23. The latching piece 22 can be attached in a latching piece retainer 2331 in a connecting plate 233.

Here the pin 234 is provided with a plurality of needle bearings 235, which can rotate about its central axis. The force receiver 23 can be swivelled about the swivel axis W, as is shown by the dashed arrow, wherein the position of the pin 234 within the housing 10 can be varied.

Figure 4:
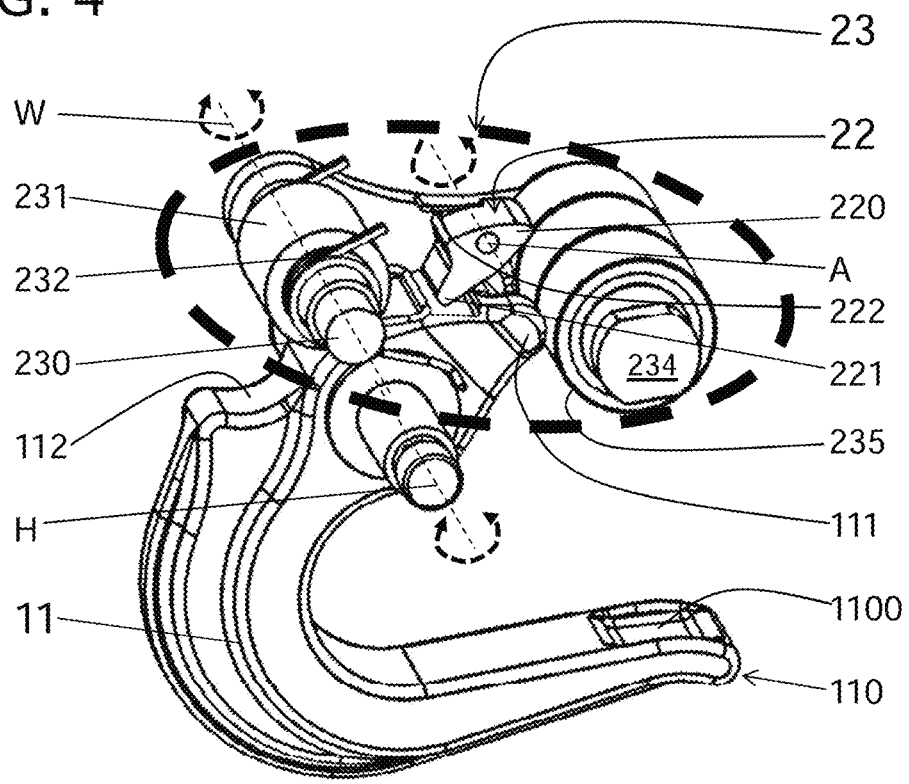
FIG. 4 shows a hook with a force receiver arranged on it in a perspective view.

As shown in FIG. 4, the force receiver 23 and the hook 11 can be operatively connected. For purposes of better illustration one connecting plate 233 has been removed from FIG. 4, so that a view onto the force receiver 23 is possible. On its side facing away from the hook tip 110 the hook 11 has a hook follower 111, which can be mounted such that it interacts with the pin 234, or more particularly, with the at least one needle bearing 235, and the latching piece 22. In the profile of the hook 11, located opposite to the hook follower 111, is also arranged a recessed stop 112. The swivelling of the hook 11 about the hook axis of rotation H can take place in one direction until the recessed stop 112 comes into contact with the buffer stop 231.

The latching piece 22 is arranged between the connecting plates 233 of the force receiver 23, and comprises a drum retainer projection 220 and a follower projection 221 that is arranged opposite the latter. The latching piece 22 is preloaded by means of a latching piece spring 222 and is mounted such that it can rotate about the latching piece axis of rotation A. The preloading of the latching piece spring 222 is here executed in an anti-clockwise sense as an example, so that the latching piece 22, when released, tries to rotate in an anti-clockwise sense in FIG. 4.

In comparison to the prior art the present helicopter load hook 1 is constructed so as to be mechanically more robust, since in the closed position hardly any forces or torques act directly from the hook 11 onto the magnetic switch 20 of the release mechanism 2. This is made clear in FIG. 5. The hook 10 is located in the closed position and is prevented from any rotational movement in the clockwise sense by the pin 234 and the needle bearings 235 located on the latter. Accordingly the hook 11 and the security latch 12 enclose the load cable 3. The hook follower 111 presses onto the pin 234. The pin 234 is held in position by the locking lug 210 of the drum 21. Since the force receiver 23 can only swivel about the swivel axis W, any movement is eliminated. Any linear movement of the force receiver 23 is prevented by the housing 10 and the hook 11. No torque acts directly from the hook 11 onto the drum 21 and thereby unto the magnetic switch 20. The pin 234 simply presses against the locking lug 210 in the closed position of the helicopter load hook 1 and the hook 11 is locked. The drum 21 has a notch 211 on its periphery, which interacts with the latching piece 22, or more particularly, with the drum projection 220 of the latching piece 22.

By virtue of the particular configuration of the force receiver 23, the latching piece 22, and the relative arrangement of the hook 11, fewer forces are introduced directly into the magnetic switch 20. With this design a helicopter load hook 1 with less wear is achieved, as result of which the operational reliability is increased. The closed position is indicated by the indicator flag 212. The indicator flag 212 is preferably configured such that it can be easily detected visually, it is, for example, provided with a signal colour and embodied so as to be sufficiently large such that it can be detected from a distance of several meters.

In what follows the opening of the helicopter load hook 1 is described with the aid of FIGS. 6a) to 6c). In the closed position in accordance with FIG. 6a) the ability of the hook 11 to rotate about its axis of rotation H is prevented, since the hook follower 111 is located against the pin 234. Since the whole force receiver 23 and thus the pin 234 cannot swivel about the swivel axis W, since the locking lug 210 is pressing against the pin 234, the hook 11 remains in its closed position in contact with the security latch 12.

If voltage is applied to the magnetic switch 20, a flow of current through the solenoid leads to the build-up of a magnetic field, which causes the rotation of the magnetic switch 20 (here in the anticlockwise sense). The drum together with the locking lug 210 is rotated with the magnetic switch 20.

The latching piece 22, preloaded by the latching piece spring 222, rotates (here in the anti-clockwise sense) such that the drum retainer projection 220 engages with the notch 211 of the drum 21, and thus fixes the drum 21 in position. The latching piece 22 prevents the drum 21 from rotating backwards. Since the locking lug 210 no longer prevents the pin 234 from moving (here upwards) the whole force receiver 23 can swivel about the swivel axis W (here upwards), wherein the swivelling movement of the hook 11 about the hook axis of rotation H is possible. At the same time the hook follower 111 swivels past the pin 234, or more particularly, the needle bearings 235 (here in the clockwise sense downwards). The movements are indicated by dashed arrows. The hook 11 accordingly swivels away from the fixed security latch 12.

The maximum swivel path of the hook 11 is achieved, when the recessed stop 112 of the hook 11 comes into contact with the buffer stop 231. The open position of the helicopter load hook 1 is then achieved, and a load cable 3 can be suspended, threaded between the hook 11 and the security latch 12. This open position is maintained without any application of voltage onto the magnetic switch 20. No forces or torques are transmitted onto the magnetic switch 20.

The path from the open position to the closed position is described with the aid of FIG. 7, wherein no load cable 3 is suspended, but rather the hook 11 is closed in an empty state.

The hook 11 is swivelled manually in the anticlockwise sense about the hook axis of rotation H, until the hook follower 111 comes into contact with the pin 234, or more particularly, the needle bearing 235. At the same time the hook follower 111 pushes the pin 234 in the direction of the drum 21. The force receiver 23 is thereby swivelled about the swivel axis W in the direction of the drum 21. Since the locking lug 210 of the drum 21 releases the pin 234, the force receiver 23 can be swivelled relative to the drum 21 and the hook 11 in the housing 10.

As soon as the hook follower has swivelled past the pin 234, the pin 234 moves away from the drum 21, wherein the force receiver 23 swivels about the swivel axis W away from the drum 21.

Figure 7A:
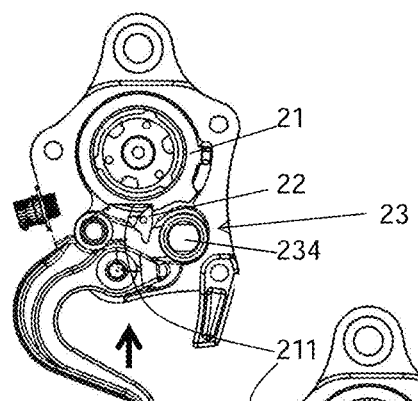
FIGS. 7a-7d show the sequence from the open position to the closed position.
Figure 7B:
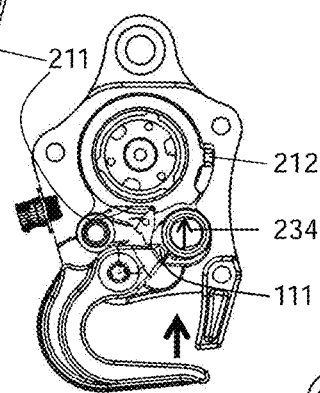
Figure 7C:
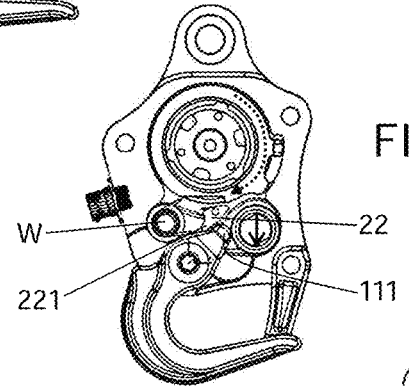
Figure 7D:
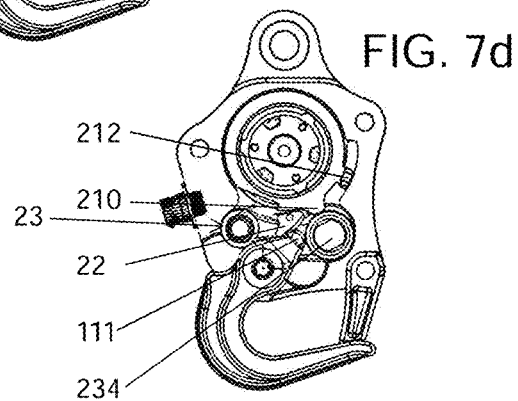

As can be detected in FIG. 7c), after it has swivelled past the pin 234, the hook follower 111 comes into contact with the latching piece 22. Stated more precisely, the hook follower 111 comes into contact with the follower projection 221 of the latching piece 22, wherein the latching piece is swivelled out of the notch 211 of the drum 21. The drum 21 then rotates into its initial position, as represented by the dashed arrow. The hook 11 swivels into its closed position, wherein the hook follower 111 is secured by the pin 234, and thereby the hook is secured against swivelling open. The locking lug 210 prevents any movement of the pin 234 and thereby of the force receiver 23. The indicator flag 212 indicates the closed position of the hook 11.

As an option a weighing system can be attached to the at least one housing eye 100, by means of which the weight of the suspended load can be determined.

In a preferred form of embodiment two magnetic switches 20, which can be operated electrically by means of control electronics, are built into the housing 10, each with a drum 21. Both magnetic switches 20 can open the hook 11 in a controlled manner by means of the force receiver 23 and the latching piece 22. By this means a safety mechanism is present if either of the magnetic switches 20 should fail. The electrical terminals 13 can be led into the housing 10 in various variants. By virtue of the configuration of the release mechanism 2, or more particularly, of the force receiver 23 and the latching piece 22, more than one magnetic switch 20 can be mounted with more than one drum 21 in the housing 10 and used for purposes of actuating the hook 11.

Needless to say, additional drives, for example, creating a mechanical or a hydraulic trigger mechanism, or more particularly, rotation of the drum 21, can be used.

REFERENCE SYMBOL LIST

1 Helicopter load hook
10 Housing (in two parts)
100 Housing eye
101 Indicator opening
102 Attachment means
11 Hook
110 Hook tip
1100 Recess
111 Hook follower
112 Recessed stop
H Hook axis of rotation
12 Security latch (rigid, fixed)
13 Electrical terminal
2 Release mechanism
20 Magnetic switch
D Magnetic switch axis of rotation
21 Drum
210 Locking lug
211 Notch
212 Indicator flag
22 Latching piece
220 Drum retainer projection
221 Follower projection
222 Latching piece spring
A Latching piece axis of rotation
23 Force receiver
230 Shaft
W Swivel axis
231 Buffer stop
232 Spring (at least one, pushes hook into the open position)
233 Connecting plate
2330 Spring retainer in the connecting plate
2331 Latching piece retainer in the connecting plate
234 Pin
235 Needle bearing (by means of which the locking lug 210 can roll)
3 Load cable

The invention claimed is:
1. A helicopter load hook comprising a release mechanism mountable in a fixed position in a housing for release of a swivel movement of a hook about a hook axis of rotation, wherein the release mechanism comprises a magnetic switch and a drum that is rotatable, wherein,
the release mechanism comprises at least one latching piece is swivellable about a latching piece axis of rotation, and a force receiver that is swivellable about a swivel axis, together with a pin, wherein the pin is operatively connectable with a locking lug on the drum together with a hook follower on the hook, such that an indirect connection between the hook and the magnetic switch, is achievable, and any direct contact between the hook and the magnetic switch is eliminated, wherein the pin eliminates any swivelling movement of the hook in the closed position of the hook.

2. The helicopter load hook of claim 1, wherein the force receiver comprises a shaft, through which the swivel axis runs, and which, together with the pin, is held by at least one connecting plate.

3. The helicopter load hook of claim 1, wherein the latching piece with a latching piece spring is mounted in a preloaded state on a connecting plate of the force receiver, and by virtue of the latching piece's ability to swivel about the latching piece axis of rotation is operatively connectable with a notch on or in the drum.

4. The helicopter load hook of claim 1, wherein the force receiver is preloaded against the hook by at least one spring, pushing the hook into the open position.

5. The helicopter load hook of claim 2, wherein the force receiver is preloaded against the hook by at least one spring, pushing the hook into the open position and wherein the at least one spring of the force receiver is held under preload in at least one spring retainer in the at least one connecting plate.

6. The helicopter load hook of claim 2, wherein the hook has a recessed stop, which in the open state of the hook comes into contact with a buffer stop of the shaft.

7. The helicopter load hook of claim 1, wherein at least one needle bearing is arranged on the pin for low wear rolling of the hook follower on the pin.

8. The helicopter load hook of claim 1, wherein an indicator flag is formed or attached on the drum, which indicator flag is moveable through an indicator opening in the housing and is visible protruding from the housing.

9. The helicopter load hook of claim 1, wherein the magnetic switch is operable electromagnetically and control signals are transmittable via at least one electrical terminal on the at least one magnetic switch.

10. The helicopter load hook of claim 1, wherein a second magnetic switch and a second drum are arranged in the housing, interacting with the force receiver and the latching piece.

11. The helicopter load hook of claim 1, wherein a hook tip is operationally connectable with a security latch arranged in a fixed position on the housing, wherein the hook tip is arranged on the side of the hook that is opposite the hook follower.

12. The helicopter load hook of claim 8, wherein the indicator flag is designed to be dimensioned and colored such that the indicator flag protrudes from the housing, and by virtue of a signal color a pilot detects the indicator flag from a cockpit.

* * * * *